United States Patent [19]

MacKendrick

[11] Patent Number: 5,599,110
[45] Date of Patent: Feb. 4, 1997

[54] BEARING FOR A PRESSURIZED PROTECTIVE SUIT

[75] Inventor: Robert R. MacKendrick, Milford, Conn.

[73] Assignee: Airlock, Incorporated, Milford, Conn.

[21] Appl. No.: 483,387

[22] Filed: Jun. 7, 1995

[51] Int. Cl.$^6$ .............................. F16C 33/61; A62B 17/00
[52] U.S. Cl. ............................. 384/501; 2/2.12; 384/513
[58] Field of Search ................................. 384/499, 501, 384/502, 507, 508, 513–516, 520–522; 2/2.12

[56] References Cited

U.S. PATENT DOCUMENTS

| | | | |
|---|---|---|---|
| 3,466,061 | 9/1969 | Fonda-Bonardi | 2/2012 |
| 3,533,497 | 10/1970 | Rojewski | 384/501 X |
| 3,743,368 | 7/1973 | Elkins et al. | 384/485 |
| 4,568,205 | 2/1986 | Basener | 384/501 |
| 4,596,054 | 6/1986 | MacKendrick et al. | |
| 4,598,427 | 7/1986 | Vykukal | 2/2.12 |
| 4,797,008 | 1/1989 | Helbig et al. | 384/501 X |
| 5,068,919 | 12/1991 | MacKendrick et al. | |
| 5,071,264 | 12/1991 | Franke et al. | 384/501 |

OTHER PUBLICATIONS

JC Engineering International Ltd.'s product brochure entitled "Ultra Slim Bearings", 1984.
Rotek Incorporated's product brochure entitled "Large-Diameter Ball and Roller Bearings" 1973, p. 7.
Wireglide Bearings, Inc.'s product brochure entitled "USB–Ultra Slim Bearings, Wire Race Bearings, Wire Elements, Retrofit Services", 1985.

Primary Examiner—Thomas R. Hannon
Attorney, Agent, or Firm—Maurice M. Klee

[57] ABSTRACT

A pressure sealing bearing (13) for use in a protective environmental suit (10) is provided. The bearing employs inner and outer races (44,54) composed of a light weight, relatively weak material, such as a plastic or aluminum alloy. To provide long wear and adequate strength, the bearing includes contoured race wires (46,48,56,58) and an interlock mechanism (72,74). The ends of inner race wire 48 are designed to butt against one another to control the deformation due to compression of the inner race (44) when pressure is applied to the bearing. The ends of outer race wire 56 include interlocking hooks (82,84) which control the deformation due to tension of the outer race (54). In this way, the bearings achieve the performance of all stainless steel bearings while providing weight reductions of at least 60%.

23 Claims, 4 Drawing Sheets

5,599,110

BEARING FOR A PRESSURIZED PROTECTIVE SUIT

FIELD OF THE INVENTION

This invention relates to pressurized protective suits and, in particular, to an improved bearing for use in forming the joints of such a suit.

BACKGROUND OF THE INVENTION

Pressurized protective suits are used in hostile environments, such as, environments containing hazardous materials and in high altitude environments, including outer space. Pressurization of such suits causes them to become rigid so that the user's movements when wearing the suit can be severely restricted. Accordingly, such suits include a variety of joints so that the user can perform tasks while wearing the suit. These joints have included neck joints, shoulder joints, elbow joints, wrist joints, waist joints, hip and thigh joints, knee joints, and ankle joints.

To provide ease of movement, prior joints have included low friction bearings. In addition to low friction, these bearings have also had low leakage so as to maintain a separation between the internal environment of the suit and the external environment. MacKendrick et. al., U.S. Pat. No. 4,596,054, shows a construction of a prior art low friction, low leakage bearing which employs ball bearings held in integral metal races with the dynamic interface between the races being sealed by an elastomeric lip seal.

One of the critical criteria for a pressurized protective suit which is to be used in a "one g" environment is the overall weight of the suit. Overall weight is also important for suits which are to be used in outer space since the training of astronauts in such suits often takes place on earth. To date, weight minimization has involved the use of relatively light weight materials, such as, plastics, polymer reinforced fabrics, and the like, to form the body of the suit.

Because of their criticality, the bearings used in the joints of pressurized protective suits have continued to be made of relatively heavy metals. Prior to the present invention, light weight bearings composed substantially of non-metallic materials have not been available to the art. In the early days of the space program, bearings made of aluminum were used, however, those bearing were found to wear rapidly and, as a result, are no longer used. Instead, stainless steel bearings are used which are both heavier and more expensive than bearings made of aluminum. The challenge to the art has been to produce bearings which have low torque, high reliability, and long life cycle properties which are comparable to bearings made from high density metals and which, at the same time, have a significantly reduced weight in comparison to such heavy bearings.

In addition to the foregoing properties, the desired light weight bearings need to have pressure retaining characteristics sufficient to withstand the internal pressures used in pressurized protective suits, i.e., the bearings must exhibit very low leak at the operating pressure of the suit. In general terms, the higher the pressure the bearing can withstand without developing significant (higher) torque, the better.

Bearings employing race wires have been commercially produced. See, for example, Wireglide Bearings, Inc.'s product brochure entitled "USB-Ultra Slim Bearings, Wire Race Bearings, Wire Elements, Retrofit Services", 1985; JC Engineering International Ltd.'s product brochure entitled "Ultra Slim Bearings", 1984; and Rotek Incorporated's product brochure entitled "Large-Diameter Ball and Roller Bearings" 1973, page 7. These bearings, however, have not had low leak characteristics and have not been used in constructing the joints of pressurized protective suits.

SUMMARY OF THE INVENTION

In view of the foregoing, it is an object of this invention to provide improved bearings for use in constructing pressurized protective suits. In particular, it is an object of the invention to provide bearings which are substantially lighter than the bearings currently used for such purposes but still have operational characteristics which provide a joint suitable for use in a protective suit.

To achieve these and other objects, the invention in accordance with certain of its aspects provides a protective suit which has an internal volume which can be pressurized to a predetermined pressure and which comprises at least one bearing which provides a pressure seal, i.e., a pressure sealing bearing, which comprises:

(a) an inner race, which is preferably composed of a non-metallic material;

(b) at least one inner race wire carried by the inner race;

(c) an outer race, which is preferably composed of a non-metallic material;

(d) at least one outer race wire carried by the outer race, said inner and outer race wires defining an annular cavity in the assembled bearing;

(e) a plurality of ball bearings in the annular cavity, which may be made of a non-metallic material;

(f) a plurality of spacers between the ball bearings, which may be made of a non-metallic material; and (g) at least one pressure seal between the inner race and the outer race for maintaining the suit's internal pressure (e.g., two pressure seals, one on each side of the annular cavity).

In certain preferred embodiments, the bearing further comprises interlock means between the inner race and the outer race for restraining deformation of those races relative to one another at suit pressures above the predetermined pressure.

In other preferred embodiments, the ends of the inner race wire butt against each other at least when the suit is pressurized to a pressure above the predetermined pressure (i.e., the ends can begin butting together at pressures below the predetermined pressure), so that the diameter of the wire cannot be reduced below a predetermined value as a result of compressive forces generated in the wire by the internal pressure within the suit.

In further preferred embodiments, the ends of the outer race wire are locked together, e.g., by interlocking hooks formed at the ends, so that the diameter of the wire remains constant under tension forces generated in the wire by the internal pressure within the suit.

These preferred embodiments of the pressure sealing bearings can be used in applications other than pressurized protective suits if desired.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

As discussed above, the present invention relates to pressure sealing bearings for use in pressurized protective suits.

Figure 1:
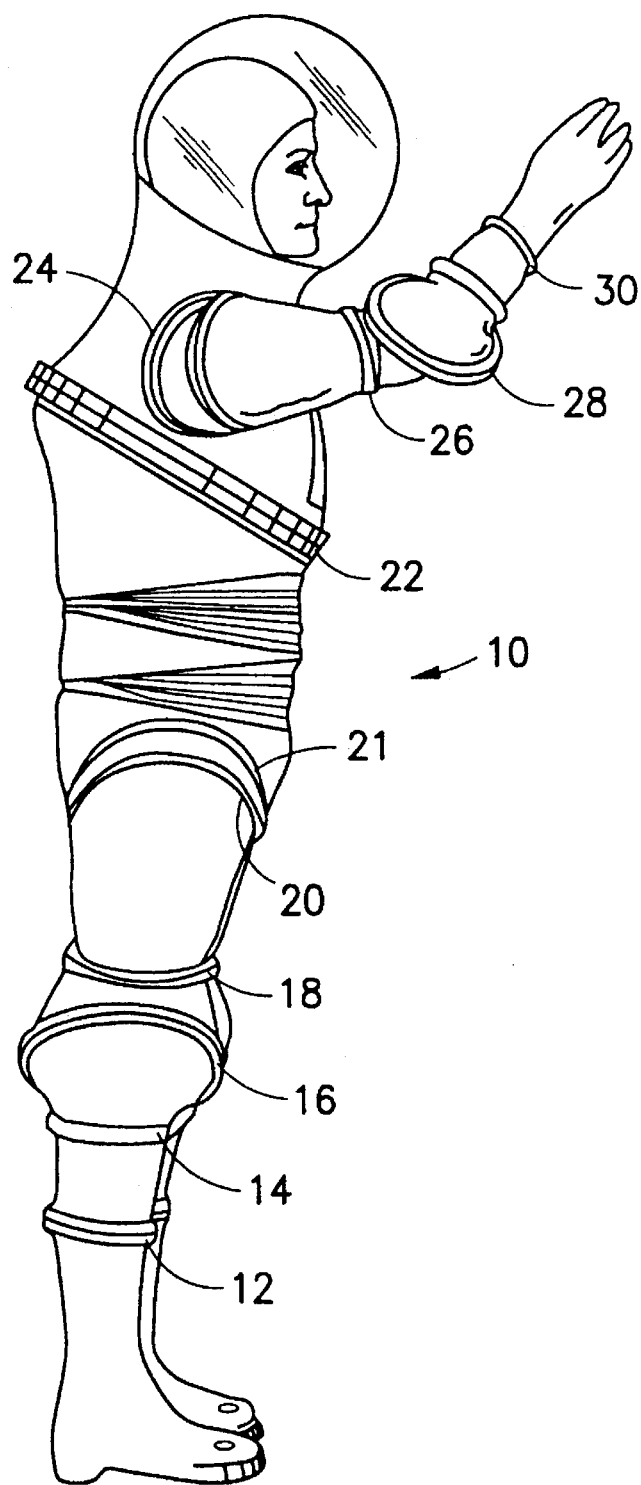
FIG. 1 is a side view of a protective suit in which the bearings of the present invention can be used.

FIG. 1 shows such a pressurized protective suit 10 having ankle joints 12, knee joints 14,16,18, thigh and hip joints 20,21, waist joint 22, shoulder joint 24, elbow joints 26,28, and wrist joint 30. The bearings of the present invention can be used in the construction of these or other joints in a pressurized protective suit.

Figure 2:
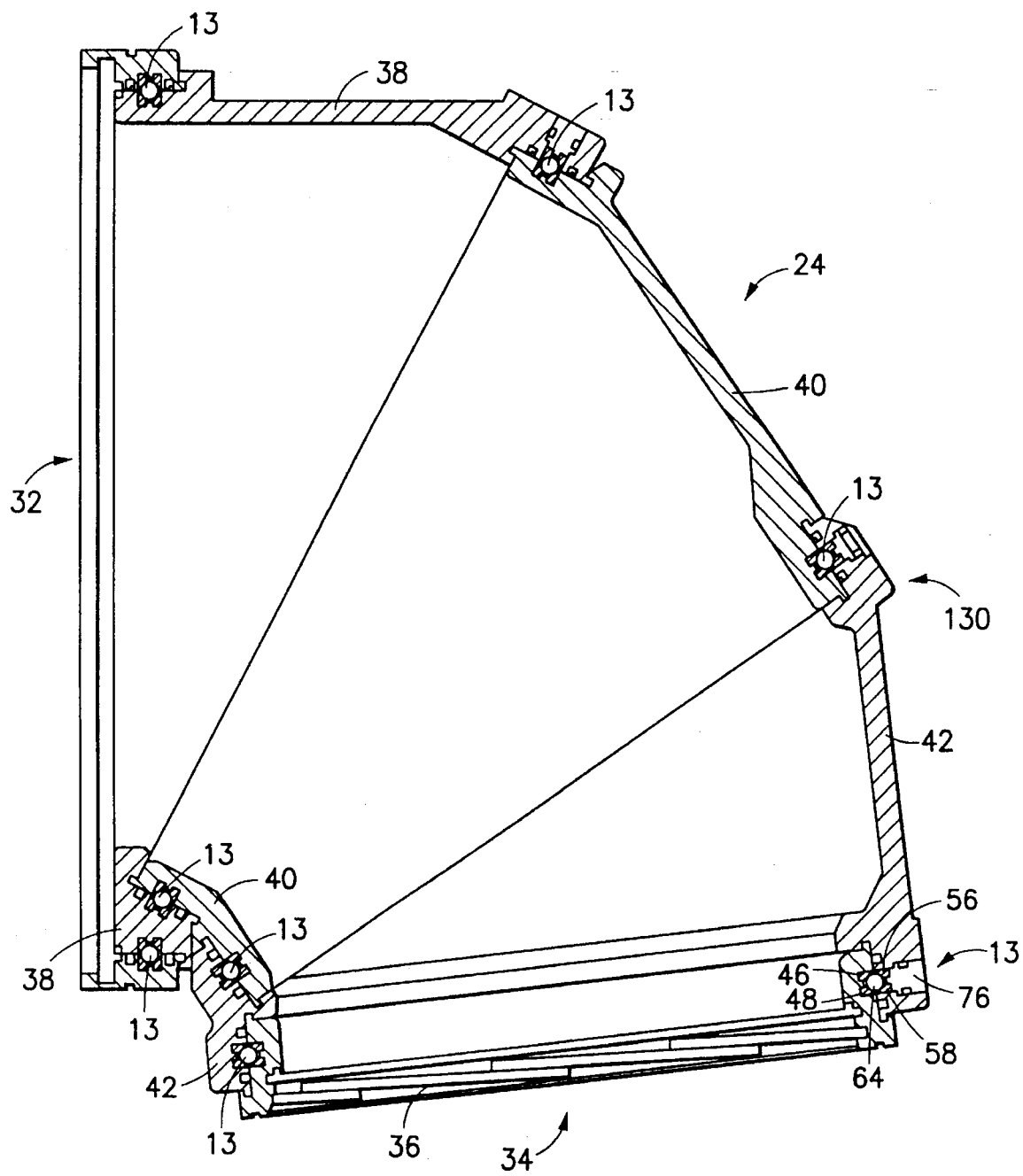
FIG. 2 is a cross-sectional view of a shoulder joint employing four bearings constructed in accordance with the present invention.

FIG. 2 shows a shoulder joint employing four pressure sealing bearings 13 constructed in accordance with the invention. The upper end of the shoulder joint is shown at 32 in FIG. 2 and the lower end at 34. Threads 36 at the lower end are used to attach the joint to an upper arm section of the suit. Other means of attachment known in the art can be used if desired. Similarly, an attachment means (not shown) is used at upper end 32 to attach the shoulder joint to a torso section of the suit.

Shoulder joint 24 is composed of three wedge-shaped sections 38,40,42. Each end of each wedge-shaped section carries a bearing 13 constructed in accordance with the invention. As shown in FIG. 2, wedge-shaped sections 38,40,42 are formed integrally with bearings 13 and are thus composed of the same material as the bearing races. It is to be understood that other configurations can be used if desired, including, for example, the attachment of fabric sections to the end surfaces of the bearings.

Figure 3:
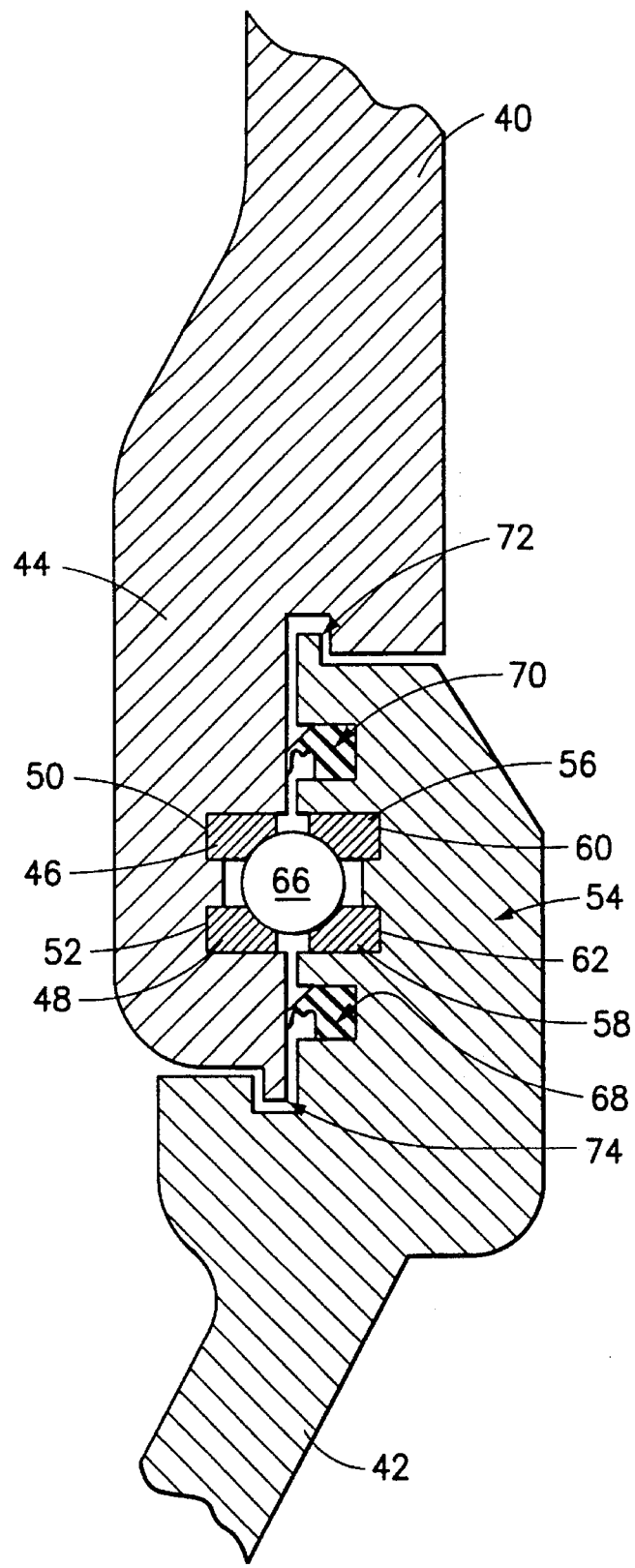
FIG. 3 is an expanded, cross-sectional view of the bearing labelled 130 in FIG. 2.

FIG. 3 is an enlarged view of the bearing labelled 130 in FIG. 2. The remaining bearings of FIG. 2 have the same construction. The high pressure side of the bearing is on the left in FIG. 2, and the low pressure side, e.g., the hostile environment side, is on the right.

Bearing 13 includes the following components:

(a) inner race 44;

(b) inner race wires 46,48 which are mounted in (carried by) grooves 50,52 in inner race 44;

(c) outer race 54;

(d) outer race wires 56,58 which are mounted in (carried by) grooves 60,62 in outer race 54;

(e) annular cavity 64 (see FIG. 2) defined by inner and outer race wires 46,48,56,58;

(f) a plurality of ball bearings 66 in the annular cavity, one of which is shown in FIG. 3;

(g) a plurality of spacers (not shown) between the ball bearings to prevent binding of the ball bearings during rotation of the joint (note that the spacers can comprise smaller ball bearings, small pellets, or a cage for the ball bearings);

(h) pressure seals 68,70 between inner race 44 and outer race 54 for maintaining the internal pressure of the suit when pressurized;

(i) interlock means 72,74 between inner race 44 and outer race 54 for restraining deformation of the inner and outer races relative to one another at internal pressures above the suit's normal operating pressure (predetermined pressure) and during unusual loading of the bearing by the user; and (j) ball feed port 76 (see FIG. 2) for introducing the ball bearings and the spacers into annular cavity 64 (note that after the balls and spacers are introduced, feed port 76 can be sealed using a plug (not shown) retained by, for example, screws).

Inner race 44 and outer race 54 can be made of a variety of materials. Preferred materials are those having a low density, e.g., a density less than about 3 grams/cubic centimeter. The material can be a light metal, such as an aluminum alloy, e.g., A 356 aluminum, or a plastic material, such as, an ultrahigh molecular weight polyethylene, a carbon composite, a PEEK polymer, or the like. When a plastic material is used, it can include various fillers and other ingredients known in the polymer art.

In many cases, the race material will have a low yield, e.g., a yield of about 30,000 pounds per square inch in the case of aluminum and about 15,000 pounds per square inch (psi) and below in the case of plastics. Nevertheless, as illustrated in the examples, the bearings of the invention can withstand substantial internal pressures.

The races are generally formed by machining, but also can be cast, injection molded, laid up in the case of composites, or formed by other conventional techniques.

The weight reductions achieved by using lighter materials for the races are significant. For example, protective suits currently used in the U.S. space program typically weigh about 150 pounds (without backpack) and can include at least 20 stainless steel bearings having a combined weight of at least 35 pounds. By means of the invention, at least a 60% reduction in this weight can be achieved by substituting an aluminum alloy for the stainless steel. When made out of such an alloy, the bearings will weigh less than 20 pounds, thus reducing the overall weight of the suit by more than 10%. Even greater reductions will result from the use of low weight plastic materials to construct the bearing races.

Race wires 46,48,56,58 are generally composed of a metallic material, such as stainless steel, but can be composed of other types of materials provided the material has sufficient hardness and strength to maintain the integrity of the bearing during loading under the expected range of pressures.

Figure 4:
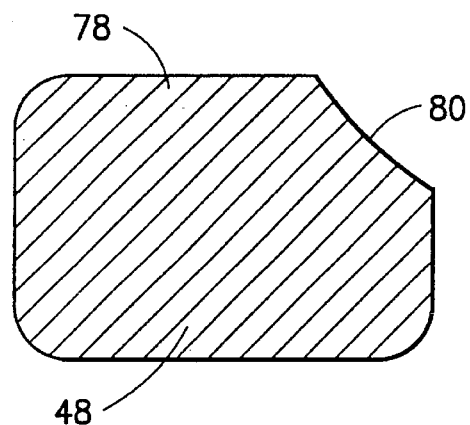
FIG. 4 is a cross-sectional view of a race wire for use in the bearing of the present invention.

FIG. 4 shows a cross-section through race wire 48. As shown therein, the race wire comprises a body 78 having a cut-out portion 80 designed to mate with ball bearings 66. Cut-out portion 80 can, for example, have the configuration of a conventional ball bearing race. Cut-out 80 can be formed in the race wire by machining, grinding, or the like.

FIGS. 2 and 3 show the use of four race wires for each bearing 13. If desired, a single race wire can be used with either the inner or outer race or with both the inner and outer races. The single wire, when used, is located where the internal pressure applies force to the bearing's races, i.e., in FIG. 3, race wires 48 and 56 must be retained. In general, it is preferred to use four race wires.

It should be noted that wire 48 is in compression and wire 56 is in tension for pressure on the left hand side of FIG. 3.

To avoid excessive changes in the length of wire 48 in response to such compressive force, the wire is preferably sized to have a length such that the ends of the wire butt against each other when the suit is pressurized so that the diameter (circumference) of the wire cannot be reduced below a predetermined value. The predetermined value is selected so as to limit the change in size of the inner race as a result of compression to a value low enough so that the seal provided by the bearing is not compromised. Preferably, wire 48 has a length which is just slightly less than the length of groove 52 so that the wire can be conveniently inserted in the groove.

Figure 5:
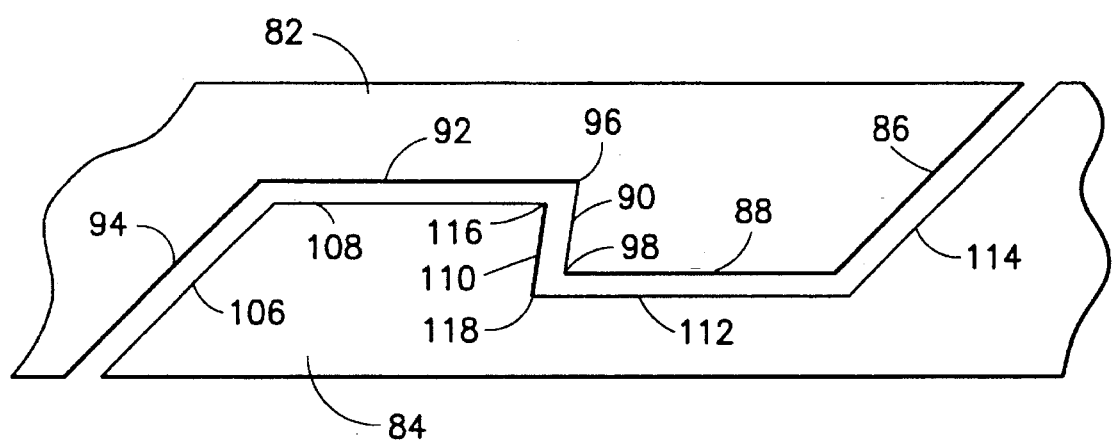
FIG. 5 is a side view of a preferred mechanism for locking together the ends of the outer race wire of the bearing of the invention.

To avoid changes in the length of wire 56 in response to tension forces generated in the wire by the internal pressure within the suit, the wire preferably includes means for locking its ends together. FIG. 5 shows a preferred form of such a locking mechanism. As shown therein, interlocking hooks 82,84 are formed at the ends of the wire race. Hook 82 is composed of surfaces 86 through 94 which mate with surfaces 106 through 114 of hook 84 as shown in FIG. 5, i.e., surface 86 mates with surface 114, etc. Surfaces 90 and 110 are undercut so as to resist separation when tension is applied to the race wire. In particular, as shown in FIG. 5, edge 98 of surface 90 lies to the left of edge 96 and similarly edge 118 of surface 110 lies to the left of edge 116. In this way, the desired undercut relationship between surfaces 90 and 110 is achieved. The hook mechanism of FIG. 5 can be formed in the race wire by various techniques including wire EDM techniques, laser cutting techniques, and the like.

Other mechanisms for locking together the ends of the outer race wire can be used if desired. For example, a separate link having a hook mechanism at each end, e.g., a hook mechanism of the type shown in FIG. 5, can be used to lock the outer race wire into a constant diameter (circumference) circle. Such a link, if provided in different lengths, can be used to adjust the cross-section of annular cavity 64 so as to achieve a preload of ball bearings 66. Such a preload can, in some circumstances, minimize the effect of ball blocking. Other mechanisms for locking the ends of the wire race together include the use of laser or TIG welding.

It should be noted that the butting together and locking mechanisms for the race wires can be omitted, if desired, when materials having a relatively high yield strength, e.g., aluminum alloys, are used in the practice of the invention.

Ball bearings 66 are typically made of stainless steel and the spacers between the balls are typically made of plastic. If desired, the ball bearings can be made of a non-metallic material, such as a ceramic.

Pressure seals 68,70 are preferably constructed in accordance with MacKendrick et al., U.S. Pat. No. 4,596,054, the relevant portions of which are incorporated herein by reference. A suitable material for the seal is a flexible polyurethane. Other seal designs and materials can be used if desired. As shown in the figures, bearing 13 includes two seals, one on each side of annular cavity 64. Such a configuration is preferred for spacesuit applications where redundancy is desirable. In other applications, a single seal can be used. Such a single seal will typically be on the pressurized side of the bearing, i.e., seal 68 in FIG. 3, so that ball feed port 76 (FIG. 2) does not have to be sealed.

Interlock means 72,74 serves the important function of restraining deformation of the inner and outer races relative to one another at pressures above the bearing's normal operating pressure. The interlock means also protects the bearing from unusual loads which may occur during use, e.g., during the handling of massive objects. Such restraining helps prevent failure of the bearing's seal. In more extreme cases, the restraining helps prevent complete failure of the bearing through dislocation of the race wires and release of the ball bearings. The restraining is especially important when materials having a low yield strength, such as plastics, are used to construct the races. With stronger materials such as aluminum alloys, the interlock can be omitted if desired.

As shown in FIG. 3, the interlock has a tongue and groove configuration which can be readily formed in races 44,54. The dimensions and tolerances of the interlock components are selected to 1) provide engagement between the tongue and the groove at a level of distortion of the races less than that which would cause pressure seals 68,70 to open, 2) provide sufficient strength to the tongue to withstand the expected distorting forces, e.g., the tongue is made relatively short so that large moments are not generated, and 3) provide adequate clearance between the tongue and groove so that these components remain out of contact during normal operation. The clearance levels can be made relatively small for plastic races since the coefficient of friction for most plastics is low.

Configurations other than those shown can, of course, be used for the interlock mechanism if desired. For example, the interlock need not be located at the interface between the inner and outer races but can be located away from that interface. Also, the interlock need not be symmetric for the low pressure and high pressure sides of the bearing, e.g., the interlock on the high pressure side can be located at the interface between the inner and outer races and that on the low pressure side can be located outward from the circumferential centerline of the bearing. It should be noted that in addition to restraining deformations of the races, the interlock serves to protect the bearing from contamination by materials released within the suit, as well as those in the outside environment.

Without intending to limit it in any manner, the present invention will be more fully described by the following examples.

EXAMPLE 1

Life Cycle Testing

A pressure sealing bearing was constructed in accordance with the configuration of FIG. 3, except that only a single pressure seal was used and the race wires did not include a locking mechanism and did not butt together. The pressure seal was located on the high pressure side of the bearing, i.e., it was seal 68 in FIG. 3.

Races 44,54 were made of ultra high molecular weight polyethylene having a density of about 0.9 grams/cc and a yield strength of about 3,400 psi. Race wires 46,48,56,58 were constructed of stainless steel and had the configuration of FIG. 4. Stainless steel ball bearings having a nominal diameter of 3/16 inches were used along with DELRIN spacer balls whose diameters were 4–5 thousandths smaller. Seal 68 was made of a flexible polyether polyurethane having a durometer value of about 70.

The bearing was subjected to life testing by being rotated back and forth by 180° for over 13,000 cycles at a rotation rate of 90°/second. The pressure applied to the bearing during these tests was 4.3 psi, the standard operating pressure for a space suit.

Leakage was monitored continuously during the testing and was found to be essentially zero at all times and thus equivalent to the current state of the art bearings.

Torque was also measured throughout the testing and was found to be essentially constant at about 2 inch-pounds at all times. This torque value is comparable to that achieved with bearings constructed entirely of stainless steel, i.e., bearings employing stainless steel races and no race wires.

As discussed above, the bearing used in this test is significantly lighter than the all stainless steel bearings currently in use in the art. Yet, as this data show, the bearing was able to achieve performance levels suitable for use in space suit applications.

EXAMPLE 2

Pressure Testing

The bearing of Example 1 was subjected to an overpressure test in which increasing pressure was applied to the bearing until a substantial overpressure condition was reached, namely, a pressure of 35 psi. The bearing was found to easily withstand this level of pressure.

To demonstrate the importance of the interlock mechanism, that mechanism was removed from the bearing and the test was repeated. In this case, failure of the bearing occurred at a pressure of 28 psi. The failure mode exhibited was a separation of the races with release of the ball bearings.

Based on this data, the interlock provided at least a 25% increase in the amount of pressure which the bearing could withstand.

Further pressure testing was performed with the bearing of Example 1 but with the race wire locking mechanism of FIG. 5 and without the interlock mechanism of FIG. 3. For this configuration, the bearing withstood a pressure of approximately 50 psi without separation of the races, at which point the experiment was stopped. A further test was performed with the pressure seal located on the low pressure side of the bearing and with the interlock removed. For this configuration, it was found that the bearing withstood a pressure of approximately 25 psi without separation of the races, at which point the experiment was stopped. In both of the foregoing experiments in which the interlock mechanism was removed, leakage of the seal was observed beginning at pressures in the 10–15 psi range.

The foregoing data show that the interlock and wire lock mechanisms of the invention provide substantial increases in the amount of pressure which the bearing can withstand. They thus allow the bearing to be composed of weak materials and still provide significant pressure resisting properties.

Although preferred and other embodiments of the invention have been described herein, other embodiments may be perceived by those skilled in the art without departing from the scope of the invention as defined by the following claims.

What is claimed is:

1. A pressure sealing bearing for maintaining a predetermined pressure comprising:
   (a) an inner race;
   (b) at least one inner race wire carried by the inner race;
   (c) an outer race;
   (d) at least one outer race wire carried by the outer race, said inner and outer race wires defining an annular cavity in the assembled bearing;
   (e) a plurality of ball bearings in the annular cavity;
   (f) a plurality of spacers between the ball bearings;
   (g) at least one pressure seal between the inner race and the outer race; and
   (h) interlock means between the inner race and the outer race for restraining deformation of those races relative to one another at pressures above the predetermined pressure.

2. A pressure sealing bearing for maintaining a predetermined pressure comprising:
   (a) an inner race;
   (b) at least one inner race wire carried by the inner race, the ends of the wire butting against each other at least when the pressure applied to the bearing is above the predetermined pressure;
   (c) an outer race;
   (d) at least one outer race wire carried by the outer race, said inner and outer race wires defining an annular cavity in the assembled bearing;
   (e) a plurality of ball bearings in the annular cavity;
   (f) a plurality of spacers between the ball bearings; and
   (g) at least one pressure seal between the inner race and the outer race.

3. A pressure sealing bearing for maintaining a predetermined pressure comprising:
   (a) an inner race;
   (b) at least one inner race wire carried by the inner race;
   (c) an outer race;
   (d) at least one outer race wire carried by the outer race, said inner and outer race wires defining an annular cavity in the assembled bearing, the ends of the outer race wire being locked together;
   (e) a plurality of ball bearings in the annular cavity;
   (f) a plurality of spacers between the ball bearings; and
   (g) at least one pressure seal between the inner race and the outer race.

4. A pressure sealing bearing for maintaining a predetermined pressure comprising:
   (a) an inner race;
   (b) at least one inner race wire carried by the inner race, the ends of the wire butting against each other at least when the pressure applied to the bearing is above the predetermined pressure;
   (c) an outer race;
   (d) at least one outer race wire carried by the outer race, said inner and outer race wires defining an annular cavity in the assembled bearing, the ends of the outer race wire being locked together;
   (e) a plurality of ball bearings in the annular cavity;
   (f) a plurality of spacers between the ball bearings;
   (g) at least one pressure seal between the inner race and the outer race; and
   (h) interlock means between the inner race and the outer race for restraining deformation of those races relative to one another at pressures above the predetermined pressure.

5. The pressure sealing bearing of claim 3 or 4 wherein the ends of the outer race wire are locked together by interlocking hooks formed at the ends.

6. The pressure sealing bearing of claim 5 wherein each of the interlocking hooks comprises an undercut mating surface.

7. The pressure sealing bearing of claim 3 or 4 wherein the ends of the outer race wire are locked together by means of a link.

8. The pressure sealing bearing of claim 1, 2, 3, or 4 wherein the inner and outer races are each composed of a non-metallic material.

9. The pressure sealing bearing of claim 1, 2, 3, or 4 wherein the inner and outer races are each composed of a metallic material having a density of less than about three grams per cubic centimeter.

10. The pressure sealing bearing of claim 9 wherein the material is an aluminum alloy.

11. The pressure sealing bearing of claim 1, 2, 3, or 4 wherein a pressure seal is located on each side of the annular cavity.

12. A suit having an internal volume which can be pressurized to a predetermined pressure, said suit comprising:

a first suit section;

a second suit section; and a rotatable joint between the first suit section and the second suit section, said rotatable joint comprising at least one pressure sealing bearing which comprises:

(a) an inner race;

(b) at least one inner race wire carried by the inner race;

(c) an outer race;

(d) at least one outer race wire carried by the outer race, said inner and outer race wires defining an annular cavity in the assembled bearing;

(e) a plurality of ball bearings in the annular cavity;

(f) a plurality of spacers between the ball bearings; and (g) at least one pressure seal between the inner race and the outer race for maintaining the suit's internal pressure upon pressurization.

13. The suit of claim 12 further comprising interlock means between the inner race and the outer race for restraining deformation of those races relative to one another at internal pressures above the predetermined pressure.

14. The suit of claim 12 wherein the ends of the inner race wire butt against each other at least when the suit is pressurized to a pressure above the predetermined pressure.

15. The suit of claim 12 wherein the ends of the outer race wire are locked together.

16. The suit of claim 12 wherein:

the ends of the inner race wire butt against each other at least when the suit is pressurized to a pressure above the predetermined pressure;

the ends of the outer race wire are locked together; and the pressure sealing bearing comprises interlock means between the inner race and the outer race for restraining deformation of those races relative to one another at internal pressures above the predetermined pressure.

17. The suit of claim 15 or 16 wherein the ends are locked together by interlocking hooks formed at the ends.

18. The suit of claim 17 wherein each of the interlocking hooks comprises an undercut mating surface.

19. The pressure sealing bearing of claim 15 or 16 wherein the ends are locked together by means of a link.

20. The suit of claim 12 wherein the inner and outer races are each composed of a non-metallic material.

21. The suit of claim 12 wherein the inner and outer races are each composed of a metallic material having a density of less than about three grams per cubic centimeter.

22. The suit of claim 21 wherein the metallic material is an aluminum alloy.

23. The suit of claim 12 wherein a pressure seal is located on each side of the annular cavity.

* * * * *